United States Patent Office 3,507,300
Patented Apr. 21, 1970

3,507,300
CONSTANT MASS CELL
Brian Lister, Addleston, England, assignor to The British Petroleum Company Limited, London, England, a corporation of England
Filed June 13, 1967, Ser. No. 645,709
Claims priority, application Great Britain, June 21, 1966, 27,684/66
Int. Cl. F16k 21/18
U.S. Cl. 137—392                                    13 Claims

ABSTRACT OF THE DISCLOSURE

A constant mass cell which contains a float whose position in the cell indicates the mass of liquid contained therein. The cell is formed into two electrical capacitors in series, the first having the cell body and the float as electrodes; the second a plate (preferably situated above the float) and the float as a electrodes. The up and down movement of the float (caused by changes in the mass of fluid) varies the distance between the float and the plate. This changes the capacitance of the second capacitor and hence the capacitance between the container and the plate.

In use the cell is connected as the control capacitance of a capacitance sensitive circuit which operates electromagnetic valves to control the flow of liquid through the cell so as to maintain constant electrical capacitance. This maintains constant float position and hence constant mass.

---

This invention relates to a constant mass cell, that is to a cell through which a stream may be passed and which is adapted to respond to changes in the mass of liquid contained within the cell so as to enable the flow through the cell to be controlled to maintain a constant mass of liquid in the cell.

Certain techniques of on-stream analysis require a sample of constant mass in order to achieve accurate results, as an example we quote the on-stream measurement of the sulphur content of a liquid petroleum fraction. This analysis is achieved by measuring the absorption of X-radiation passed through a sample of the fluid; the absorption depends upon the sulphur content of the sample and the total mass of liquid through which the radiation passes. Thus, in order to use this technique, it is necessary to pass a stream of liquid to be tested through an absorption cell and to control the flow in such a manner that the cell always contains a constant mass of fluid. It is an object of this invention to provide a constant mass cell which is suitable for such applications.

Figure 1:
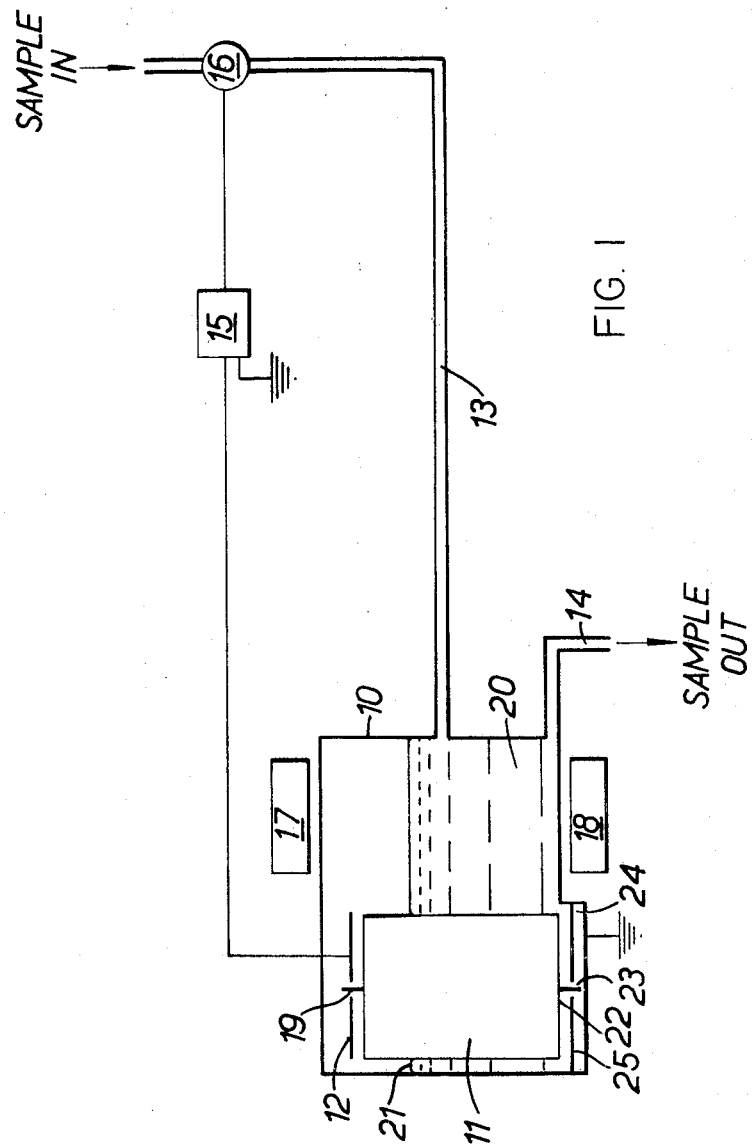
FIG. 1 depicts an embodiment of the invention in which the liquid level of the constant mass cell is regulated at the intake line.

According to the invention a constant mass cell comprises a container for a liquid which contains a float shaped so that its level of floatation on a liquid contained therein is indicative of the mass of the liquid, the container and the float forming the electrodes of a first capacitor which is connected in series with a second variable capacitor whose electrodes are the float and a plate positioned inside the container, preferably above the float so that changes in the mass of fluid contained in the cell cause the relative position of the plate and the float to alter and thereby cause the total capacitance to vary.

The float comprises an upper portion which is never, in the use of the cell, below the surface of the liquid and a lower portion which is, in the use of the cell, always below the surface of the liquid. In the use of the cell the liquid level moves up and down the intermediate zone, the liquid level zone, when the density changes. In order to achieve constant mass control in a cell of constant cross sectional area (or where the mass of interest is that of a uniform column, e.g. the case of the X-ray technique mentioned above) the float must have a constant cross sectional area in the liquid level zone and it is convenient for the float to have a constant cross sectional area over its whole height; for example a cylindrical float is particularly convenient.

Where a constant cross sectional area float is used the constant mass condition requires that the liquid level, and hence the position of the float, to be adjusted so that the base of the float just "touches" the bottom of the container. To ensure that the float is always fully supported by the liquid in the cell a well may be provided in the floor of the cell underneath the float. This enables the float to be maintained with its base level with general floor level of the the container while still permitting up and down motion.

This invention also includes a constant mass control system in which a constant mass cell as described above is connected as the control capacitor of a capacitance sensitive circuit whose output is applied to one or more electro-magnetic valves in such a manner that, in the use of the control system, the signal produced when the capacitance of the constant mass cell indicates too high a mass in the cell causes the flow to be altered so as to reduce the quantity of liquid contained in the cell.

In the control system just described it is possible to use valves in both the inlet and outlet of the constant mass cell but it is preferred to use a single electromagnetic control valve situated in the inlet.

Theoretically the best control will be achieved when the capacitance sensitive circuit/electro-magnetic control valve arrangement is such that a proportionate control is exercised. However we have found that, for most practical purposes, a simple on/off arrangement is sufficient; in this case the capacitance sensitive circuit becomes a capacitance operated switch. A capacitance bridge circuit may be used for both proportionate and on/off control and a Miller-Pierce oscillator provides a good on/off control.

The invention will now be described by way of example with reference to the drawing which shows a constant mass cell according to the invention connected into a constant mass control system.

The constant mass cell comprises a container 10 which contains a cylindrical float 11 situated below a plate 12. The weight distribution of the float is such that it floats with its axis vertical and it is constrained to move vertically by jewelled bearings 19 and 23 situated in the plate 12 and a frame 25. The bearings provide electrical insulation so that the float 11 is not in electrical contact with any other part of the cell.

In the use of the cell the float 11 floats in the liquid 20 which is contained in the cell and therefore the mass displaced by the float 11 between the liquid level 21 and the base of the float 22 will be constant and equal to the mass of the float. The floor of the container 10 is shaped to provide a well 24 underneath the float 11. Thus the liquid level 21 may be adjusted so as to maintain the base of the float 22 at the level of the floor of the container 10 outside the well 24. This adjustment maintains a constant mass of fluid in the container 10.

Electrically the constant mass cell consists of two capacitors in series. The electrodes of the first capacitor are the container 10 and the float 11; its capacitance is substantially constant for the motion of the float 11. The electrodes of the second capacitor are the float 11 and the plate 12; its capacitance is a measure of the distance between the plate 12 and the float 11. The nearer the float approaches to the plate the greater the capacitance so that an increasing capacitance indicates an increasing mass. Thus a constant mass of fluid can be retained in the cell by keeping its capacitance constant as described below.

The constant mass cell is connected as part of the anode capacitance of a crystal controlled oscillator 15 which is of the Miller-Pierce type. This type of oscillator has the property that its oscillation abruptly ceases when its anode capacitance is increased above a critical amount. The anode capacitance is adjusted so that it is equal to this critical amount when the float is situated with its base 22 level with the floor of the container as described above. A slight increase in the mass will therefore cause the anode capacitance to exceed the critical amount so that the oscillator will produce no output. A slight decrease will reduce the anode capacitance so that the ouput will be restored.

Figure 2:
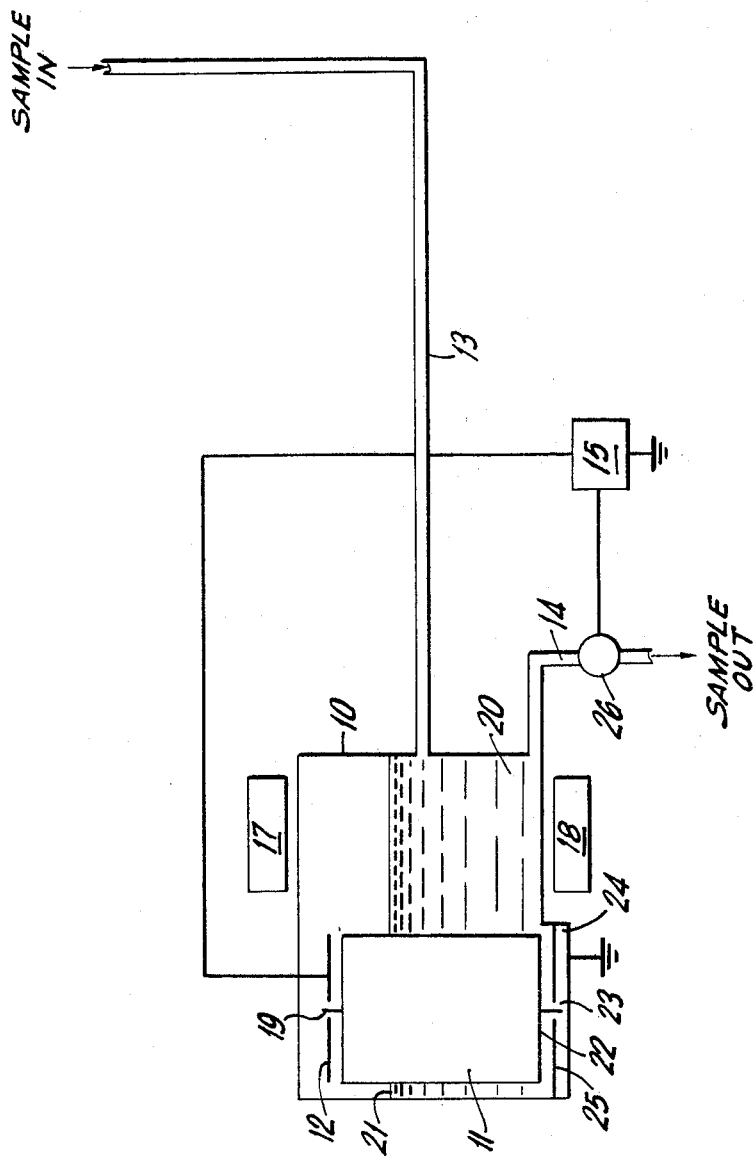
FIG. 2 depicts an embodiment of the invention in which the liquid level of the constant mass cell is regulated at the outlet line.

The liquid level of the constant mass cell is controlled either by the utilization of one or more electromagnetic valves in the inlet line in FIG. 1 at numeral 16 or in the embodiment represented in FIG. 2 by one or more electromagnetic valves in the outlet line at numeral 26. In application, the valve or valves represented by numerals 16 and 26 are responsive (indirectly) to the output of the oscillator 15.

In the preferred embodiment of the invention, a single electro-magnetic valve is utilized at numeral 16 of FIG. 1 to achieve liquid level control. Although the preferred embodiment of the invention contains a single valve at numeral 16, nothing is meant to so limit my invention. One can utilize either one or a plurality of electro-magnetic valves within the inlet or outlet at numeral 16 or numeral 26, depending upon which embodiment concept is utilized.

Under the preferred embodiment (FIG. 1), a single valve is utilized at numeral 16 and is such that valve 16 is normally closed so as to permit no sample to enter the constant mass cell but when operated it opens to allow the sample to flow. The rates of flow at the inlet and the outlet are adjusted so that when the valve 16 is closed the liquid level in the cell falls slowly and when the valve is open the level rises slowly. With this arrangement it has been found that the opening and closing of the valve 16 in accordance with the signals of the oscillator 15 maintains a constant mass of fluid in the constant mass cell. In an experimental arrangement we have found that (with liquid of constant specific gravity) the liquid level may be maintained to within ±0.1 mm.

As shown in the drawing the oil in the constant mass cell may be subjected to X-radiation from the source 17 and the intensity of the emergent radiation is measured by the detector 18. Thus the absorbance (which depends upon the sulphur content and the mass of oil in the cell) is continuously monitored; since the mass is maintained constant the sulphur content is measured. (It will be appreciated that the measurement of the X-radiation to estimate sulphur content is a standard technique which does not form part of this invention.)

I claim:
1. A constant mass cell which comprises a container for a liquid which contains a float shaped so that its level of flotation on a liquid contained therein is indicative of the mass of the liquid, the container and the float forming the electrodes of a first capacitor which is connected in series with a second variable capacitor whose electrodes are the float and a plate positioned inside the container so that changes in the mass of fluid contained in the cell cause the relative position of the plate and the float to alter and thereby cause the total capacitance to vary.

2. A constant mass cell according to claim 1, in which the float has a uniform area of cross-section at the liquid level zone.

3. A constant mass cell according to claim 2, in which the float has a uniform area of cross-section throughout its height.

4. A constant mass cell according to claim 3, in which the float is cylindrical.

5. A constant mass cell according to claim 3, in which the floor of the cell is provided with a well so that the float can be fully supported by the liquid in the cell with the base of the float on the level of the general floor level of the container.

6. A constant mass cell according to claim 1, in which the plate which forms one electrode of the capacitor is situated above the float.

7. A constant mass control system which comprises a constant mass cell according to claim 1, electro-magnetic valves for controlling the liquid throughout of said cell and a capacitance sensitive and circuit whose input is connected to the container and the plate and whose output is applied to the electro-magnetic valves in such a manner that, in the use of the control system, the signal produced when the capacitance of the constant mass cell indicates too high a mass in the cell causes the flow to be altered so as to reduce the quantity of liquid contained in the cell.

8. A constant mass control system according to claim 7, in which there is one electro-magnetic valve situated in the inlet.

9. A constant mass control system according to claim 8, in which the valve is an on/off valve and the capacitance sensitive circuit is a capacitance operated switch which closes the valve whenever the mass content of the cell is too high.

10. A constant mass control system according to claim 7, in which there is one electro-magnetic valve situated in the outlet.

11. A constant mass control system according to claim 10, in which said valve is an on/off valve and the capacitance sensitive circuit is a capacitance operated switch which opens the valve whenever the mass content of the cell is too high.

12. A constant mass cell as described in claim 1 wherein said float is free of electrical connections.

13. A constant mass cell as described in claim 12 wherein said float is free of mechanical supporting means attached to the walls of said container.

References Cited

UNITED STATES PATENTS

| 1,747,498 | 2/1930 | Archibald | 137—412 |
| 2,319,363 | 5/1943 | Wunsch et al. | 340—200 X |
| 2,437,661 | 3/1948 | Coake | 340—200 X |
| 2,704,342 | 3/1955 | Fielden | 73—313 X |
| 3,181,557 | 5/1965 | Lannan | 137—391 |

FOREIGN PATENTS

| 1,172,367 | 6/1964 | Germany. |

WILIAM F. O'DEA, Primary Examiner

D. R. MATTHEWS, Assistant Examiner

U.S. Cl. X.R.

73—304; 324—61; 340—244